United States Patent
Roev et al.

(10) Patent No.: US 10,439,227 B2
(45) Date of Patent: Oct. 8, 2019

(54) CATHODE, LITHIUM AIR BATTERY INCLUDING SAME, AND PREPARATION METHOD THEREOF

(71) Applicant: Samsung Electronics Co., Ltd., Suwon-si, Gyeonggi-do (KR)

(72) Inventors: Victor Roev, Suwon-si (KR); Dong-min Im, Seoul (KR); Sang-bok Ma, Suwon-si (KR); Won-sung Choi, Yongin-si (KR); Min-sik Park, Hwaseong-si (KR); Dong-joon Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/915,210

(22) Filed: Mar. 8, 2018

(65) Prior Publication Data
US 2018/0198134 A1    Jul. 12, 2018

Related U.S. Application Data

(62) Division of application No. 14/185,154, filed on Feb. 20, 2014, now Pat. No. 9,947,933.

(30) Foreign Application Priority Data

Feb. 21, 2013 (KR) .......................... 10-2013-0018830

(51) Int. Cl.
*H01M 4/86* (2006.01)
*H01M 12/08* (2006.01)
(Continued)

(52) U.S. Cl.
CPC ....... *H01M 4/8657* (2013.01); *H01M 4/8668* (2013.01); *H01M 4/8846* (2013.01);
(Continued)

(58) Field of Classification Search
None
See application file for complete search history.

(56) References Cited

U.S. PATENT DOCUMENTS 7,282,295 B2    10/2007  Visco et al.
7,691,536 B2     4/2010  Johnson et al.
(Continued)

FOREIGN PATENT DOCUMENTS

CN    102439783 A    5/2012
JP    07-220733 A    8/1995
(Continued)

OTHER PUBLICATIONS

Chinese Office Action for Chinese Patent Application No. 201410060077.8 dated Apr. 28, 2017.
(Continued)

*Primary Examiner* — Wyatt P McConnell
(74) *Attorney, Agent, or Firm* — Cantor Colburn LLP

(57) ABSTRACT

An air battery cathode including an organic-inorganic composite material including lyophobic nanopores, the organic-inorganic composite material including a porous metal oxide, and a lyophobic layer on a surface of a pore of the porous metal oxide and having a contact angle of greater than about 90°; and a binder. Also a lithium air battery including the cathode, and a method of manufacture the cathode.

24 Claims, 6 Drawing Sheets

(51) Int. Cl.
  *H01M 4/88* (2006.01)
  *H01M 4/90* (2006.01)
(52) U.S. Cl.
  CPC ......... *H01M 4/9016* (2013.01); *H01M 12/08* (2013.01); *H01M 2220/20* (2013.01); *Y02E 60/128* (2013.01)

(56) References Cited

U.S. PATENT DOCUMENTS

| | | | |
|---|---|---|---|
| 7,767,345 | B2 | 8/2010 | Imagawa et al. |
| 9,166,263 | B2 | 10/2015 | Ma et al. |
| 9,178,254 | B2 | 11/2015 | Lee et al. |
| 9,263,779 | B2 | 2/2016 | Lee et al. |
| 9,680,191 | B2 | 6/2017 | Lee et al. |
| 2007/0154766 | A1 | 7/2007 | Baik et al. |
| 2007/0231704 | A1 | 10/2007 | Inda |
| 2007/0238001 | A1* | 10/2007 | Koyama ............... H01B 1/122 429/480 |
| 2008/0070087 | A1 | 3/2008 | Johnson |
| 2011/0059355 | A1 | 3/2011 | Zhang et al. |
| 2011/0129739 | A1 | 6/2011 | Nakanishi |
| 2011/0200891 | A1 | 8/2011 | Kotani et al. |
| 2011/0223494 | A1* | 9/2011 | Feaver ............... H01M 4/8615 429/405 |
| 2012/0007795 | A1 | 1/2012 | Selbrede |
| 2012/0077084 | A1 | 3/2012 | Christensen et al. |
| 2012/0115046 | A2 | 5/2012 | Mak et al. |
| 2012/0115048 | A1 | 5/2012 | Roev et al. |
| 2012/0115049 | A1 | 5/2012 | Rinzler et al. |
| 2012/0276459 | A1 | 11/2012 | Im et al. |
| 2013/0011753 | A1* | 1/2013 | Noda .................. H01M 12/06 429/405 |
| 2013/0224609 | A1 | 8/2013 | Lee et al. |

FOREIGN PATENT DOCUMENTS

| | | |
|---|---|---|
| JP | 2002293529 A | 10/2002 |
| JP | 2012-502427 A | 1/2012 |
| JP | 201326148 A | 2/2013 |
| JP | 201333721 A | 2/2013 |
| JP | 2013033721 A | 2/2013 |
| KR | 1020060130640 A | 12/2006 |
| KR | 1020100099031 A | 9/2010 |
| KR | 1020120023715 A | 3/2012 |
| KR | 20120047602 A | 5/2012 |
| KR | 20120063163 A | 6/2012 |
| KR | 20120122674 A | 11/2012 |
| KR | 20130046247 A | 5/2013 |
| KR | 20130099706 A | 9/2013 |
| KR | 20130112314 A | 10/2013 |
| KR | 20140006639 A | 1/2014 |
| WO | 2010126767 A2 | 11/2010 |

OTHER PUBLICATIONS

Andrei et al., "Some Possible Approaches for Improving the Energy Density of Li-Air Batteries", Journal of The Electrochemical Society, 157(12), 2010, A 1287-A1295.

J. Read et al., "Oxygen Transport Properties of Organic Electrolytes and Performance of Lithium/Oxygen Battery," Journal of The Electrochemical Society, Aug. 27, 2003, pp. A1351-A1356, vol. 150, Issue No. 10.

Japanese Office Action for Japanse Patent Application No. 2014-030268 dated Feb. 5, 2018.

Jie Xiao et al., "Optimization of Air Electrode for Li/Air Batteries," Journal of The Electrochemical Society, Mar. 3, 2010, pp. A487-A492, vol. 157, Issue No. 4.

Paul Albertus et al., "Identifying Capacity Limitations in the Li/Oxygen Battery Using Experiments and Modeling," Journal of The Electrochemical Society, Jan. 24, 2011, pp. A343-A351, vol. 158, Issue No. 3.

Rubin Battino et al., "The Solubility of Oxygen and Ozone in Liquids," Journal of Physical and Chemical Reference Data, 1983, (Published Online: Oct. 15, 2009), pp. 163-178, vol. 12, Issue No. 2.

Floriane et al., "Surface modification of calcium carbonate nanofillers by fluoro- and alkyl-alkoxysilane: Consequences on the morphology . . . ", European Polymer Journal, Mar. 12, 2012, pp. 919-929, Issue 48.

Liangming et al., "Synthesis of Polymer-Mesoporous Silica Nanocomposites", Materials, Jul. 13, 2010, doi:10.3390/ma3074066, pp. 4066-4079, Issue 3.

Office Action issued by the Korean Patent Office dated Nov. 9, 2018 in the examination of the Korean Patent Application No. 10-2013-0018830, which corresponds to above U.S. Appl. No. 15/915,210.

* cited by examiner

Contace angle

CATHODE, LITHIUM AIR BATTERY INCLUDING SAME, AND PREPARATION METHOD THEREOF

CROSS-REFERENCE TO RELATED APPLICATION

This application is a divisional application of application Ser. No. 14/185,154, filed Feb. 20, 2014, and claims priority to and the benefit of Korean Patent Application No. 10-2013-0018830, filed on Feb. 21, 2013, and all the benefits accruing therefrom under 35 U.S.C. § 119, the content of which is incorporated herein in its entirety by reference.

BACKGROUND

1. Field

The present disclosure relates to a cathode, a lithium air battery including the same, and preparation methods thereof.

2. Description of the Related Art

A lithium air battery includes an anode capable of intercalating and deintercalating lithium, a cathode that oxidizes or reduces oxygen in the air, and an electrolyte disposed between the anode and the cathode.

Since the lithium air battery uses lithium metal as an anode and does not have to store the cathode active material (i.e., oxygen in the air) within the battery, the lithium air battery may have high capacity. A lithium air battery has a high theoretical energy density per unit weight of 3,500 Watt-hours per kilogram (Wh/kg) or greater, which is about ten times greater than that of a lithium ion battery.

It has been disclosed that a concentration gradient of oxygen occurs within a porous cathode, and that the concentration of oxygen is decreased in an area adjacent to a separator. Thus, due to the low concentration of oxygen in the area adjacent to the separator, a discharge capacity of the cathode may be limited. In order to increase the concentration of oxygen that is delivered to the inside of the cathode, a porosity of the cathode may be increased. However, in regard to the cathode having improved porosity, impregnation of the electrolyte is increased, and accordingly oxygen delivery may be blocked.

Therefore, there is a demand for methods of improving the discharge capacity of the lithium air battery by increasing the concentration of the cathode active material without increasing impregnation of the electrolyte within the cathode.

SUMMARY

Provided is a cathode including a novel organic-inorganic composite material.

Provided is a lithium air battery including the cathode.

Provided are methods of manufacturing the composite material.

Additional aspects will be set forth in part in the description which follows and, in part, will be apparent from the description.

According to an aspect, an air battery cathode includes an organic-inorganic composite material having lyophobic nanopores, the organic-inorganic composite material including a porous material, and a lyophobic layer on a surface of a nanopore of the porous material; and a binder.

According to another aspect, a lithium air battery includes an anode capable of absorbing and desorbing lithium ions; the air battery cathode; and an electrolyte disposed between the cathode and the anode.

According to another aspect, a method of manufacturing an air battery cathode includes combining an organic-inorganic composite material and a binder to manufacture the cathode, wherein the organic-inorganic composite material is manufactured by: impregnating a porous material with a reactive compound including a reactive functional group bondable to the porous material; and chemically bonding the reactive compound to a surface of the porous material to form a lyophobic layer on the surface of the porous material to manufacture the organic-inorganic composite material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
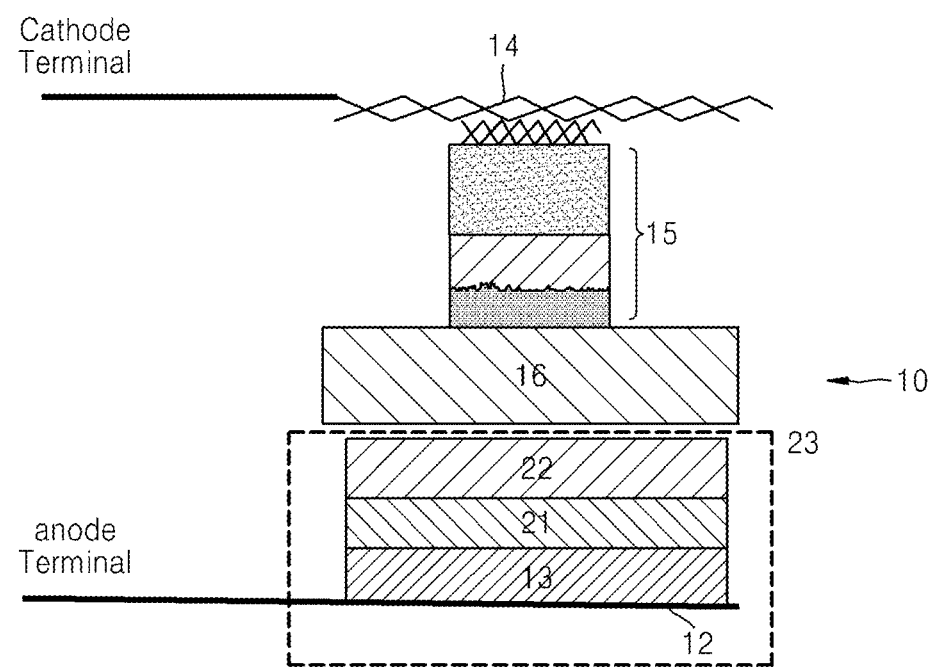
FIG. 1 is a schematic view of a structure of an embodiment of a lithium air battery.

Reference will now be made in detail to embodiments of a cathode, a lithium air battery including the cathode, and a preparation method thereof, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes," and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkoxy" means an alkyl group that is linked via an oxygen (i.e., —O-alkyl). Nonlimiting examples of C1 to C30 alkoxy groups include methoxy groups, ethoxy groups, propoxy groups, isobutyloxy groups, sec-butyloxy groups, pentyloxy groups, iso-amyloxy groups, and hexyloxy groups.

"Alkyl" means a straight or branched chain saturated aliphatic hydrocarbon having the specified number of carbon atoms, specifically 1 to 12 carbon atoms, more specifically 1 to 6 carbon atoms. Alkyl groups include, for example, groups having from 1 to 50 carbon atoms (C1 to C50 alkyl).

A cathode according to an embodiment includes an organic-inorganic composite material having lyophobic nanopores; and a binder, wherein oxygen is used as a cathode active material.

The lithium air battery may use an aqueous electrolyte and/or an organic non-aqueous electrolyte as an electrolyte. When the organic non-aqueous electrolyte is used, a reaction mechanism of a lithium air battery may be represented by the following Reaction Scheme 1:

$$4Li+O_2 \leftrightarrow 2Li_2O \quad E°=2.91\ V$$

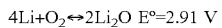

$$2Li+O_2 \leftrightarrow Li_2O_2 \quad E°=3.10\ V \qquad \text{Reaction scheme 1}$$

During discharge, a lithium ion originated from the anode reacts with oxygen introduced from the cathode to form a lithium oxide, and as a result, the oxygen is reduced (referred to as an "oxygen reduction reaction ('ORR')"). During charge, the lithium oxide is reduced and oxygen is generated as a result of oxidizing of the oxygen (referred to as an "oxygen evolution reaction ('OER')"). Also, during discharge, $Li_2O_2$ is deposited on the pores of the cathode, and a capacity of the lithium air battery increases as a concentration of oxygen diffused into the cathode increases.

According to an embodiment, the cathode includes the organic-inorganic composite material having lyophobic nanopores. Oxygen may be more easily delivered throughout, e.g., to the inside of, the cathode through the lyophobic nanopores and a passage for oxygen delivery may be maintained since the lyophobic nanopores are not impregnated by the electrolyte. Thus, oxygen transport in the cathode may be improved. As a result, and while not wanting to be bound by theory, by maintaining a higher concentration of oxygen inside the cathode, the discharge capacity of the lithium air battery including the cathode may be increased.

The nanopores included in the organic-inorganic composite material may be nano-sized pores and each may have a diameter of less than 1,000 nm. The composite material may have an ordered pore structure. For example, the composite material may have an ordered pore structure having a plurality of regularly arranged pores as shown in FIG. 2B. The ordered pore structure may provide a continuous and/or linear passage without curves, and thus oxygen may be more easily delivered within and throughout the cathode. Also, a material having an irregular pore structure may contain pores having variously sized cross sections, and the pores may be connected to each other through a narrower space than the pores themselves. Thus, in a material having a discontinuous and/or sinuous passage that is provided by pores having the irregular pore structure, the delivery of oxygen may be inhibited or effectively prevented.

The organic-inorganic composite material included in the cathode may comprise a porous metal oxide, and the organic-inorganic composite material may have a number of channels through which oxygen may be delivered.

In addition, the composite material may have a periodic pore structure. For example, the composite material may have a periodic arrangement of pores having a cubic, lamellar, oblique, centered rectangular, body-centered orthorhombic, body-centered tetragonal, rhombohedral, or hexagonal topology or architecture. In some embodiments, the composite material may have a periodic arrangement of pores as shown in FIG. 2C.

The pores included in the composite material may each have a size of 3 nm or greater, for example, in a range from about 3 nm to about 50 nm. In some embodiments, the size may be in a range from about 3.5 nm to about 15 nm, or from about 5 nm to about 15 nm. When the size is less than 2 nm, oxygen may not be easily delivered through the pores, and when the size is greater than 50 nm, a mechanical strength to maintain a backbone of the composite material may not be obtained. In an embodiment, an average pore size of the pores in the composite material may be about 3 nm to about 50 nm, specifically about 3.5 nm to about 30 nm, more specifically about 5 nm to about 15 nm.

In some embodiments, a maximum peak in a pore size distribution of the composite material, when obtained by a Barrett-Joyner-Halenda ("BJH") method, may be in a range from about 3 nm to about 50 nm. For example, the maximum peak in a pore size distribution may be in a range from about 3 nm to about 30 nm, when obtained by the BJH method.

The composite material may have pores that are substantially uniform in size. The term "substantially uniform" used herein refers to that 75% or more, for example, in a range from about 80% to about 95%, of pores have a pore diameter within a range of 30%, for example, within a range of 10%, or within a range of 5%, of an average pore diameter. For example, 85% or more, for example, in a range from about 90% to about 95%, of the pores included in the composite material may have a pore diameter within a range of 30%, for example, within a range of 10%, or within a range of 5%, of the average pore diameter. In an embodiment, a peak in a pore size distribution of the composite material, when obtained by the BJH method, is in a range from about 3 nm to about 50 nm, and 75% of the pores have a size of about 3 nm to about 50 nm. In another embodiment, a peak in a pore size distribution of the composite material, when obtained by the BJH method, is in a range from about 5 nm to about 15 nm, and 85% of the pores have a size of about 3 nm to about 50 nm, when obtained by the BJH method.

The composite material may have a specific surface area of 500 square meters per gram ($m^2/g$) or less, when measured using the Brunauer-Emmett-Teller ("BET") method. In some embodiments, the porous carbon-based composite material may have a specific surface area in a range from about 100 $m^2/g$ to about 500 $m^2/g$. For example, the specific surface area of the porous carbon-based composite material may be in a range from about 200 $m^2/g$ to about 400 $m^2/g$.

The composite material may be in the form of a particle, and in bulk may be in the form of a powder. Therefore, the composite material may be molded into various forms, and used for a variety of applications.

In addition, the composite material of the cathode may partially include a lyophobic layer. For example, the cathode may include a layer including the composite material, wherein a portion of the layer surface is lyophobic. For example, the cathode may have a structure in which the lyophobic layer is disposed in at least a portion of a surface of the cathode. The lyophobic layer may be disposed on a portion, e.g., 10 percent (%) to 90%, specifically 20% to 80%, of the lyophobic nanopores. Also, the cathode may include a partially lyophobic layer, e.g., a partially lyophobic layer formed by combining the lyophobic composite material with a lyophilic material.

In the cathode, the composite material may include a porous metal oxide; and a lyophobic coating layer that is disposed, e.g., formed, on at least a portion of the pores included in the porous metal oxide. The composite material may be porous.

By forming the lyophobic coating layer as described above, the composite material may become lyophobic, and the lyophobic coating layer may be disposed uniformly on an inside thereof and on an outer surface of the porous metal oxide.

The porous metal oxide may include at least one element of Groups 3 to 14 of the Periodic Table of the Elements. For example, the porous metal oxide may include at least one element of Mg, Al, Si, P, Ca, Ti, V, Ga, Ge, Sr, Zr, Nb, Mo, In, Sn, Hf, Ta, or W.

In some embodiments, examples of the porous metal oxide may comprise $SiO_2$, $TiO_2$, NiO, $PbO_2$, $CoO_2$, $Co_3O_4$, $Mn_2O_3$, $MnO_2$, MnO, $GeO_2$, $BaTiO_3$, zeolite, $Al_2O_3$, ZnO, or the like, or a combination thereof, but is not limited thereto. Any suitable material available as a porous metal oxide in the art may be used.

Figure 3:
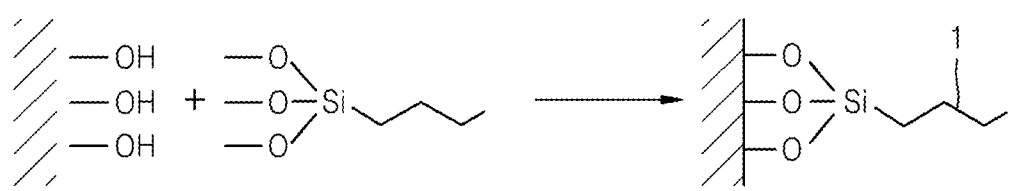
FIG. 3 is a schematic view illustrating an embodiment of a reaction for formation of chemical bonds on a porous surface.

In the composite material, the lyophobic coating layer may form a chemical bond to the porous metal oxide. In some embodiments, the lyophobic coating layer may include an organic compound which bonds to a pore surface of the porous metal oxide. For example, the lyophobic coating layer may include a monolayer of the organic compound which bonds to a pore surface of the porous metal oxide. For example, the lyophobic coating layer may include a monolayer of an organic compound, wherein the monolayer is self-assembled on the pore surface of the porous metal oxide. That is, the lyophobic coating layer may be a surface modifier that modifies the surface characteristics of the pore surface of the porous metal oxide so that the pore is hydrophobic and/or lyophobic. For example, as shown in FIG. 3, the organic compound may form a chemical bond to the surface of a pore of the porous metal oxide by bonding to functional groups presents on the pore surface. Also, the organic compound forming the lyophobic coating layer may be disposed in a direction perpendicular to the pore surface. Thus, depending on a length of the organic compound, a thickness of the lyophobic coating layer may be selected, e.g., to be about 1 nm to about 20 nm. For example, when the length of a linear organic compound 1 is about 1 nm, the thickness of the lyophobic coating layer also may be about 1 nm.

Figure 4:
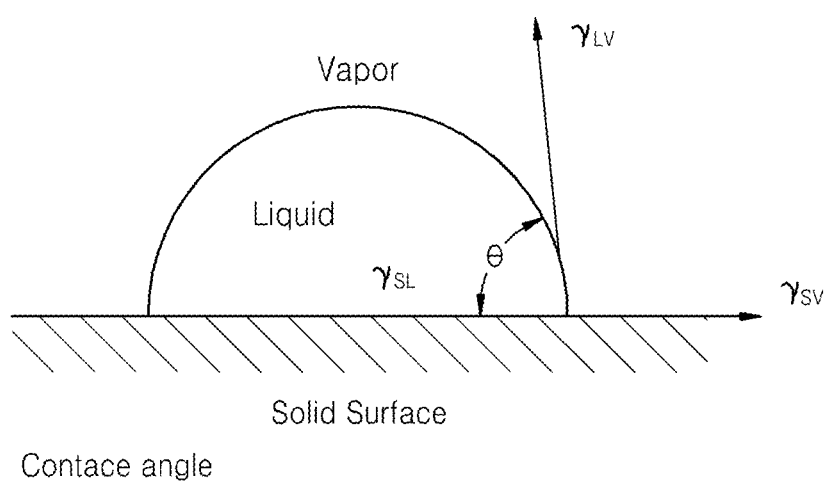
FIG. 4 is a schematic view illustrating a method of measuring a contact angle.

In the composite material, a contact angle of the lyophobic coating layer with respect to water at a temperature of 20° C. may exceed about 90°, and for example, the contact angle may exceed about 100° or about 110°, and may be about 90° to about 170°, or about 95° to about 160°, or about 100° to about 150°. The contact angle is an angle at a point where the surface of water on the lyophobic coating layer is in contact with the surface of the lyophobic coating layer. For example, the contact angle may correspond to the angle θ in FIG. 4, wherein $\gamma_{SL}$ is an interfacial tension between the lyophobic coating layer and water, $\gamma_{SV}$ is an interfacial tension between the lyophobic coating layer and air, and $\gamma_{LV}$ is an interfacial tension between water and air.

The lyophobic coating layer of the composite material may comprise at least one atom of F, Cl, Br, or I. For example, the lyophobic coating layer may include an F atom, and accordingly lyophobicity of the lyophobic coating layer may be improved. In addition, the lyophobic coating layer may include silicon atoms or oxygen atoms. For example, the lyophobic coating layer may be bonded on the pore surface of the porous metal oxide via an —O—Si— bond.

In the composite material, the thickness of the lyophobic coating layer may be in a range from about 0.1 nm to about 20 nm, but is not limited thereto. The thickness thereof may be selected depending on the size of the organic compound used to form the lyophobic coating layer. For example, the thickness of the lyophobic coating layer in the composite material may be in a range from about 0.5 nm to about 10 nm. In some embodiments, the thickness thereof may be in a range from about 0.5 nm to about 5 nm, or from about 0.5 nm to about 2 nm.

An amount of the lyophobic coating layer may be about 2 wt % to about 50 wt %, specifically about 4 wt % to about 40 wt %, more specifically about 6 wt % to about 30 wt %, based on a total weight of the organic-inorganic composite material.

An amount of the composite material may be in a range from about 1 weight percent (wt %) to about 20 wt %, based on a total weight of the cathode. For example, the amount of the composite material may be in a range from about 1 wt % to about 15 wt %, or from about 2 wt % to about 10 wt %, based on a total weight of the cathode. When the amount of the composite material is too small, the oxygen transfer effect may be negligible. On the contrary, when the amount is too large, the electron transport may be impeded.

The cathode may additionally include an oxygen oxidation/reduction catalyst. For example, the catalyst may include at least one of a metal particle, a metal oxide particle, an organometallic compound, or a combination thereof.

The metal particle may include at least one of Co, Ni, Fe, Au, Ag, Pt, Ru, Rh, Os, Ir, Pd, an alloy thereof, or a combination thereof. The metal oxide particle may include at least one of manganese oxide, cobalt oxide, iron oxide, zinc oxide, nickel oxide, strontium oxide, lanthanum oxide, barium oxide, lithium oxide, titanium oxide, potassium oxide, magnesium oxide, calcium oxide, yttrium oxide, niobium oxide, zirconium oxide, copper oxide, chromium oxide, molybdenum oxide, a metal oxide having perovskite crystal structure having an empirical formula of $AMO_3$ such as $(Sm,Sr)CoO_3$, $(La,Sr)MnO_3$, $(La,Sr)CoO_3$, $(La,Sr)(Fe,Co)O_3$, $(La,Sr)(Fe,Co, Ni)O_3$, $La_{0.8}Sr_{0.2}MnO_3$ ("LSM"), or $La_{0.6}Sr_{0.4}Co_{0.8}Fe_{0.2}O_3$ ("LSCF"), a composite oxide thereof, or a combination thereof. The organometallic compound may include an aromatic heterocyclic compound that is coordinated to a transition metal, but is not limited thereto. Any suitable material available as an oxygen oxidation or reduction catalyst in the art may be used.

In some embodiments, the oxygen oxidation or reduction catalyst may include tungsten carbide (WC), a WC fused cobalt, $CoWO_4$, $FeWO_4$, NiS, $WS_2$, $La_2O$, $Ag_2O$, cobalt phthalocyanine, or the like, or a combination thereof.

In addition, the oxygen oxidation and/or reduction catalyst may be supported on a support. The support may be the above-described porous composite material, carbon, or the like. Examples of the carbon include carbon black, such as Ketjen black, acetylene black, channel black, or lamp black, graphite such as natural graphite, artificial graphite, or expanded graphite, activated carbon, or carbon fiber, but the carbon is not limited thereto. Any suitable support material available as a support in the art may be used.

An example of manufacturing the cathode is as follows.

First, the organic-inorganic composite material and the binder are combined to provide a mixture, and the mixture is added to an appropriate solvent to prepare a cathode slurry. The cathode slurry may be coated and then dried on a surface of a current collector, optionally press-molding the dried coating in order to improve an electrode density, thereby preparing a cathode.

The binder may include a thermoplastic resin or a thermosetting resin. Examples of the binder are polyethylene, polypropylene, polytetrafluoroethylene ("PTFE"), polyvinylidene difluoride ("PVdF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, or an ethylene-acrylic acid copolymer, which may be used alone or in combination, but the binder is not limited thereto. Any suitable material available as a binder in the art may be used.

A porous body having a network structure or mesh structure may be used as a current collector to facilitate diffusion of oxygen. A porous metal plate that is made of stainless steel, nickel, or aluminum may be used, and the material thereof is not limited thereto. Any material available as a current collector in the art may be used. The current collector may be coated with an anti-oxidation metal or an alloy coating film to prevent oxidation.

The cathode slurry may additionally include a commercially available oxygen oxidation/reduction catalyst and a conductive material. Also, the cathode slurry may additionally include a lithium oxide.

Any porous and conductive material may be used as a conductive material of the cathode slurry, and for example, a porous carbon-based material may be used. Examples of the porous carbon-based material are carbon black, graphite, graphene, activated carbon, carbon fibers, or the like. Also, a metallic conductive material, such as a metal fiber and a metal mesh, may be used. Moreover, a metal powder comprising copper, silver, nickel, aluminum, or the like, or a combination thereof, may be used. Also, an organic conductive material, e.g., including a polyphenylene derivatives, may be used. The above-described conductive materials may be used alone or in a combination.

According to another embodiment, the lithium air battery includes an anode capable of absorbing, e.g., intercalating or alloying, and capable of desorbing, e.g., deintercalating or dealloying, a lithium ion; the cathode, and an electrolyte disposed between the anode and the cathode.

In regard to the lithium air battery, the discharge capacity per unit weight of the cathode in a first discharge cycle may be 530 mAh/g, based on a total weight of the composite material, the binder, and the catalyst, at a voltage greater than about 2.0 V with respect to a lithium metal, wherein the first discharge cycle is performed at room temperature (20° C.) and at 1 atmosphere (atm) under ambient dry air conditions (dew point −80° C.) by applying a constant current of about 1 mA/cm$^2$ in a voltage window ranging from about 2.0 V to about 4.2 V.

For example, the discharge capacity may be 550 mAh/g, based on a total weight of the composite material, the binder, and the catalyst or greater, or 700 mAh/g, based on a total weight of the composite material, the binder, and the catalyst, or greater.

Examples of the anode capable of absorbing and desorbing a lithium ion include Li metal, an alloy of Li metal, or a material capable of intercalating Li, but the anode is not limited thereto. Any material available as an anode capable of absorbing, e.g., intercalating, and desorbing, e.g., deintercalating, a lithium ion in the art may be used. Since the anode may effectively determine the capacity of the lithium air battery, the anode may be, for example, a lithium metal. The alloy of the Li metal may be an alloy of lithium and another metal, for example, aluminum, tin, magnesium, indium, calcium, titanium, or vanadium, or the like, or a combination thereof.

The electrolyte may be an organic non-aqueous electrolyte or an aqueous electrolyte.

The organic electrolyte may include an aprotic solvent. Examples of the aprotic solvent are carbonate-based, ester-based, ether-based, ketone-based, and alcohol-based solvents. Examples of the carbonate-based solvents are dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methylethyl carbonate ("MEC"), ethylene carbonate ("EC"), propylene carbonate ("PC"), butylene carbonate ("BC"), or tetraethylene glycol dimethyl ether ("TEGDME"). Examples of the ester-based solvents are methyl acetate, ethyl acetate, n-propyl acetate, dimethyl acetate, methyl propionate, ethyl propionate, γ-butyrrolactone, decanolide, valerolactone, mevalonolactone, or caprolactone. Examples of the ether-based solvents are dibutyl ether, tetraglyme, diglyme, dimethoxyethane, 2-methyltetrahydrofuran, or tetrahydrofuran. An example of the ketone-based solvent is cyclohexanone. Also, examples of the alcohol-based solvent are ethyl alcohol or isopropyl alcohol. Examples of the aprotic solvent are not limited thereto, and any suitable combination of the foregoing, or any suitable material available as an aprotic solvent in the art, may be used.

In addition, examples of the aprotic solvent include nitriles, such as compounds of the formula R—CN, wherein R is a $C_2$-$C_{20}$ linear, branched, or cyclic hydrocarbon-based moiety that may include a double-bonded aromatic ring or an ether bond, amides such as dimethylformamide, dioxolanes such as 1,3-dioxolane, or sulfolanes.

As noted, the aprotic solvent may be used alone or in a combination of two or more. In the latter case, a mixing ratio of at least two aprotic solvents may be appropriately selected depending on a performance of the battery, and the mixing ratio may be determined by one of ordinary skill in the art without undue experimentation.

In addition, the organic electrolyte may include an ionic liquid. Examples of the ionic liquid are compounds consisting of cations such as linearly or branchedly substituted ammonium, linearly or branchedly substituted imidazolium, linearly or branchedly substituted pyrrolidinium, or linearly or branchedly substituted piperidinium cations, and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The organic electrolyte may include a salt of an alkali metal and/or an alkali earth metal. The salt of the alkali metal and/or alkali earth metal, dissolved in an organic solvent, may be used as a source of alkali metal ions and/or alkali earth metal ions in the battery. For example, the salt may facilitate migration of the alkali metal ions and/or alkali earth metal ions between the cathode and the anode.

In some embodiments, cations of the alkali metal salt and/or alkali earth metal salt may include lithium ions, sodium ions, magnesium ions, potassium ions, calcium ions, rubidium ions, strontium ions, cesium ions, barium ions, or the like.

Anions of the alkali metal salt and/or alkali earth metal salt in the organic electrolyte may include at least one ion of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (where x is a natural number from 1 to 100), $(C_xF_{2x+1}SO_2)(C_yF_{2y+1}SO_2)N^-$ (where x and y are natural numbers from 1 to 100), or a halide.

In some embodiments, the salt of the alkali metal and/or alkali earth metal may include at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiI, or $LiB(C_2O_4)_2$ (lithium bis(oxalato) borate, "LiBOB"), and examples thereof are not limited thereto. Any suitable material available as a salt of an alkali metal and/or alkali earth metal in the art may be used.

In the organic electrolyte, an amount of the salt of the alkali metal and/or alkali earth metal may be in a range from about 100 millimolar (mM) to about 10 molar (M), for example, from about 500 mM to about 2 M. However, an amount of the salt of the alkali metal and/or alkali earth metal is not particularly limited thereto, as long as the organic electrolyte may effectively transfer lithium ions and/or electrons during charging and discharging.

The separator is not limited so long as a composition thereof is suitably durable in an operating environment of the lithium air battery, and examples of the composition are a non-woven polymer such as a non-woven fabric of a polypropylene material or a non-woven fabric of a polyphenylene sulfide material, a porous film of an olefin-based resin such as polyethylene, polypropylene, or the like, or a combination thereof.

Also, a lithium ion conductive solid electrolyte membrane may be additionally disposed between the anode and the organic electrolyte. The lithium ion conductive solid electrolyte may serve as a protective layer that protects lithium contained in the anode from directly reacting with the impurities, such as water, oxygen or the like, which may be included in the liquid electrolyte. Examples of the lithium ion conductive solid membrane are a lithium ion conductive glass, a crystalline lithium ion conductor (e.g., a ceramic or a glass-ceramic), or an inorganic material comprising a combination thereof. However, the lithium ion conductive solid membrane is not limited thereto, and any suitable material available as a lithium ion conductive solid membrane in the art may be used. Also, when a chemical stability of the solid electrolyte membrane is taken into consideration, an example of the lithium ion conductive solid electrolyte membrane may be an oxide.

An example of the crystalline lithium ion conductor may be $Li_{1+x+y}(Al, Ga)_x(Ti_zGe_{1-z})_{2-x}Si_yP_{3-y}O_{12}$, wherein $0 \le x \le 1$, and $0 \le y \le 1$, and for example, $0 \le x \le 0.4$, $0 < y \le 0.6$, or $0.1 \le x \le 0.3$, $0.1 < y \le 0.4$, and wherein $0 \le z \le 1$. Examples of the lithium ion conductive glass-ceramic are lithium-aluminum-germanium-phosphate ("LAGP"), lithium-aluminum-titanium-phosphate ("LATP"), lithium-aluminum-titanium-silicon-phosphate ("LATSP"), or the like. A combination comprising at least one of the foregoing can be used.

The lithium ion conductive solid membrane may further include a polymer solid electrolyte component, in addition to a glass-ceramic component. The polymer solid electrolyte may be a polyethylene oxide doped with a lithium salt, and examples of the lithium salt are $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or the like. A combination comprising at least one of the foregoing can be used.

The lithium ion conductive solid electrolyte membrane may further include an inorganic solid electrolyte component, in addition to the glass-ceramic component. Examples of the inorganic solid electrolyte component are $Cu_3N$, $Li_3N$, lithium oxynitride phosphorous (LiPON), or the like. A combination comprising at least one of the foregoing can be used.

An example of manufacturing the lithium air battery is as follows.

First, a cathode including the porous composite material, an anode capable of intercalating and deintercalating lithium ions, and a separator are prepared.

Next, the anode is disposed in one side of a case, and the cathode with the separator is disposed in the other side of the case and opposite to the anode. Subsequently, an electrolyte is disposed, e.g., injected, between the cathode and the anode, a porous current collector is disposed on the cathode, and a pressing member that allows air to reach the cathode is pressed to fix a cell, thereby completing the manufacture of the lithium air battery. A lithium ion conductive solid electrolyte membrane may be further disposed on a surface of the anode.

The case may be divided into upper and lower parts, which contact the anode and cathode, respectively. An insulating resin may be interposed between the upper and lower parts to electrically insulate the cathode and the anode from each other.

The lithium air battery is available either as a lithium primary battery or a lithium secondary battery. The lithium air battery may have any of various forms, and for example, may be in the form of a coin, a button, a sheet, a stack, a cylinder, a plane, or a horn. Also, the lithium air battery may be used to provide a large battery for an electric vehicle.

FIG. 1 is a schematic view of an embodiment of a lithium air battery 10. The lithium air battery 10 includes a cathode 15, which is configured to use oxygen as an active material and is disposed adjacent to a first current collector 14, an anode 13 including lithium and disposed adjacent to a second current collector 12, an organic electrolyte (not illustrated) disposed between the cathode 15 and the anode 13, and a separator 16 disposed on one surface of the cathode 15. On one surface of the anode 13, the separator 21, which is impregnated with the organic electrolyte, and a lithium ion conductive solid membrane 22 may be sequentially disposed. The anode 13, the separator 21, and the solid electrolyte membrane 22 may be covered with a pouch 23, which contacts the separator 16. The first current collector 14, which is porous, may serve as a gas diffusion layer allowing diffusion of air. A pressing member (not illustrated) allowing air to reach the cathode may be further disposed on the first current collector 14. A case (not illustrated) of an insulating material is disposed between the cathode 15 and the anode to electrically separate the cathode and the anode. The lithium air battery may be disposed in a stainless steel container if desired.

The term "air" used herein is not limited to atmospheric air, and may refer to a combination of gases including oxygen, or pure oxygen gas. This broad definition of "air" also applies to other terms, including an air battery, air electrode, or the like.

In some embodiments, a method of manufacturing the organic-inorganic composite material includes impregnating a porous metal oxide with a reactive compound; and forming a lyophobic coating layer by chemically binding the reactive compound onto a pore surface of the porous metal oxide.

By forming a lyophobic coating layer by chemically binding the reactive compound on a pore surface of the porous metal oxide, the organic-inorganic composite material is obtained.

The method of impregnating the porous metal oxide with the reactive compound is performed by contacting, e.g., mixing, the porous metal oxide and the reactive compound. The reactive compound may be used in a state in which it is dissolved in a solvent.

Examples of the porous metal oxide are $SiO_2$, $TiO_2$, $NiO$, $PbO_2$, $CoO_2$, $MnO_2$, $MnO$, $Co_3O_4$, $Mn_2O_3$, $GeO_2$, $BaTiO_3$, zeolite, $Al_2O_3$, $ZnO$, or the like, but are not limited thereto. Any suitable material available as a porous metal oxide in the art may be used.

The pore size of the porous metal oxide, e.g., average pore size, may be in a range from about 4 nm to about 50 nm. In some embodiments, the pore size, e.g., average pore size, may be in a range from about 4.5 nm to about 15 nm, or from about 5 nm to about 11 nm. In some other embodiments, example, the pore size, e.g., average pore size, may be in a range from about 12 nm to about 13 nm. When the pore size is less than 4 nm, the pore may be blocked by the lyophobic coating layer. Also, when the pore size is larger than 50 nm, a sufficient mechanical strength to maintain a backbone of the composite material may not be obtained.

In the manufacturing method, the process of forming the lyophobic coating layer may be performed at a temperature of 40° C. or higher. In some embodiments, the process of forming the lyophobic coating layer may be performed at a temperature in a range from about 40° C. to about 80° C. When the process of forming the lyophobic coating layer is performed at a low temperature, e.g., near 20° C., the reactive compound may not chemically bind onto a surface of the porous metal oxide, and may remain as a residue on the surface of the pores. Then, the residual reactive compound may be removed in a subsequent drying process. For example, the process of forming lyophobic coating layer may be performed by leaving a mixture of the reactive compound impregnated on the porous metal oxide compound at a temperature of 40° C. or higher for about 1 hour.

During the process of forming the lyophobic coating layer, a temperature of 40° C. or higher may be maintained for about 1 to 10 hours, but is not limited thereto. Any suitable duration of time available to form the lyophobic coating layer may be used. For example, during the process of forming the lyophobic coating layer, a temperature of 40° C. or higher may be maintained for about 4 to 8 hours.

The process of forming the lyophobic coating layer may be performed in a closed space, e.g., in a sealed reactor vessel. When the process of forming the lyophobic layer is performed in an open space, the coating layer may not be uniformly formed due to volatilization of the solvent, or the like.

The reactive compound used in the method may be dissolved in a non-aqueous solvent. When the reactive compound is dissolved in an aqueous solvent, the reactive compound may be transformed into other compounds by hydrolysis or the like, and thus may not suitably react with the porous metal oxide.

Examples of the non-aqueous solvent are acetone, a ketone, or the like, but are limited thereto. Any suitable material available as a solvent that does not cause hydrolysis in the art may be used. The non-aqueous solvent may be any suitable aprotic solvent. Aprotic solvents are further disclosed above and not repeated for clarity.

After the process of forming the lyophobic coating layer, a drying process that is performed at a temperature in a range from about 10° C. to 150° C. may be further included. A portion of the reactive compound that is not reacted, e.g., bonded to the porous metal oxide, or the solvent, may be removed by the drying process.

In greater detail, the drying process may be performed at a room temperature of about 20° C. for about 1 to 3 days, at a temperature in a range from about 70° C. to about 90° C. for about 1 to 2 days, and at a temperature in a range from about 100° C. to about 150° C. for about 1 to 4 hours.

The reactive compound may include a reactive functional group that is able to bind to the pore surface of the metal oxide. The reactive functional group may include at least one of a hydroxyl group (HO—), a thiol group (—SH), an alkoxy group (RO—), a thioalkyl group (RS—), a halogen group (X—), an aldehyde group (—C(O)H), a carboxyl group (—C(O)OH), or a carboxylate group (—COO$^-$), but is not limited thereto. Any suitable material available as a functional group in the art which is able to bind to a metal oxide may be used.

The reactive compound may include at least some of the fluorinated compound, and thereby improved lyophobicity may be provided on the coating layer.

For example, the reactive compound may include at least one of a siloxane-based compound in which at least some portion is fluorinated, a silazane-based compound in which at least some portion is fluorinated, an aminosilane-based compound in which at least some portion is fluorinated, or a mercaptosilane-based compound in which at least some portion is fluorinated. The reactive compound is not limited thereto. Any suitable material available as a compound in which at least some portion is fluorinated and that is able to combine with a metal oxide in the art may be used.

Also, the reactive compound may include at least one of a non-fluorinated siloxane-based compound, a non-fluorinated silazane-based compound, a non-fluorinated aminosilane-based compound, and a non-fluorinated mercaptosilane-based compound, but the reactive compound is not limited thereto. Any material available as a compound that is not fluorinated, is able to combine with a metal oxide, and is able to provide a suitably lyophobic coating layer may be used.

Hereinafter, an embodiment will be disclosed in further detail with reference to the following examples. These examples shall not limit the scope of the disclosed embodiments.

EXAMPLES (Manufacture of Lyophobic Porous Composite Material)

Example 1

1 gram (g) of porous silica $SiO_2$ (available from S-Chemtech, Korea) having a pore size of 8 nanometers (nm) was added to a solution including 4 mL of hexamethylacetone and 1 milliliter (mL) of fluorooctyltrimethoxysilane ($CF_3(CF_2)_5CH_2CH_2Si(OCH_3)_3$), and the porous silica was impregnated with the silane-based compound for 15 minutes while mixing the solution.

The porous silica $SiO_2$ in which the silane-based compound is impregnated was aged in a closed space at a temperature of 60° C. for 6 hours to form a lyophobic coating layer on pores of the silica.

Next, the porous silica $SiO_2$ was dried in an open space at a temperature of 20° C. for 48 hours, and then dried again in an open space at a temperature of 80° C. for 24 hours. Finally, the porous silica $SiO_2$ was vacuum dried at a temperature of 120° C. for about 2 hours to prepare a composite material.

In the composite material, an amount of the lyophobic coating layer, measured by thermogravimetric analysis ("TGA"), was 32.2 weight percent (wt %).

Figure 2A:
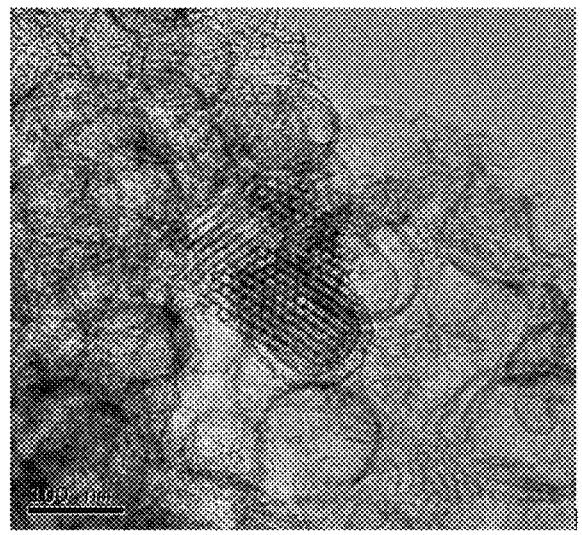
FIGS. 2A to 2C are high resolution transmission electron microscopy ("HR-TEM") images of porous silica used in the manufacturing of composite materials in Example 1.
Figure 2B:
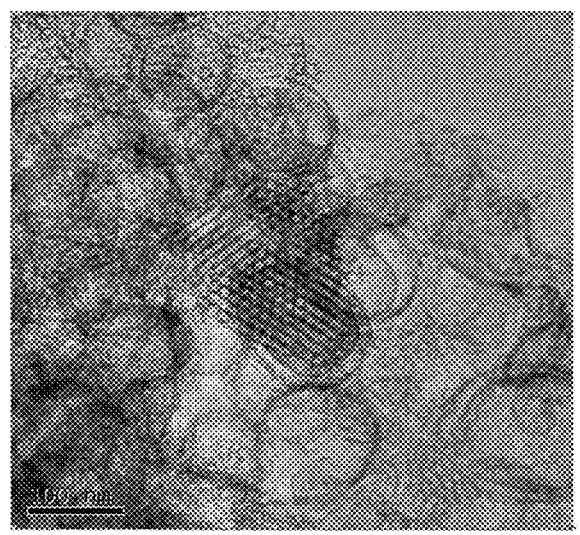
Figure 2C:
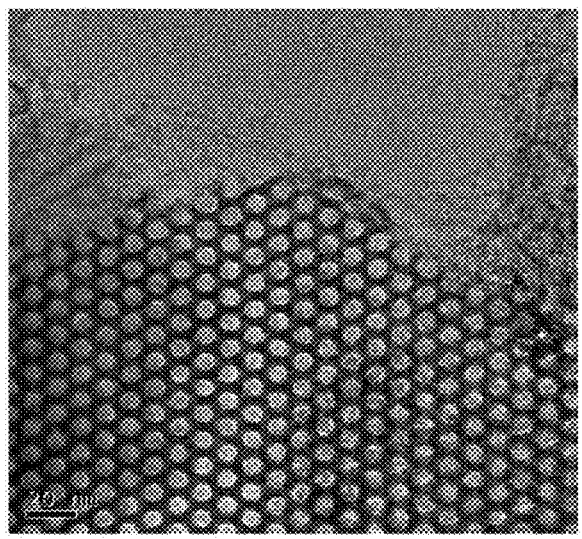

FIGS. 2A to 2C are transmission electron microscopy ("TEM") images of the porous silica used in the manufacture of the composite material. As shown in the micrographs, the composite material shows substantially the same, ordered, and periodic porous structure except that the pore size thereof has been relatively reduced in comparison with the bare porous silica.

Example 2

A composite material was manufactured in the same manner as in Example 1, except that the amount of fluorooctyltrimethoxysilane was changed to 0.75 mL.

In the composite material, the amount of the lyophobic coating layer, measured by TGA, was 29.9 wt %.

Example 3

A composite material was manufactured in the same manner as in Example 1, except that the amount of fluorooctyltrimethoxysilane was changed to 0.5 mL.

In regard to the composite material, the amount of the lyophobic coating layer, measured by TGA, was 27.3 wt %.

Comparative Example 1

Porous silica $SiO_2$ (available from S-Chemtech, Korea) having a pore size of 8 nm was used as it is.

Comparative Example 2

A composite material was manufactured in the same manner as in Example 1, except that the process of forming the lyophobic layer on pores of the silica. The porous silica impregnated with the silane-based compound in a closed space was dried at a temperature of 60° C. for 6 hours was omitted.

Comparative Example 3

Porous silica $SiO_2$ having a pore size of 2.8 nm was manufactured as follows.

As starting materials, tetraethylorthosilicate ("TEOS", 98% solution from Aldrich) as a silicon source, cetyltrimethylammonium chloride ("CTACl", 25% from Aldrich) as a surfactant, and NaOH (Samchun Pure Chemical) were used. The starting materials were mixed in a ratio of 1 mole of TEOS:0.25 mole of $Na_2O$:0.65 mole of CTACl:62 mole of $H_2O$ to form a mixture. Then, after forming a homogeneous gel by stirring the mixture, the gel was heated at a temperature of 95° C. for 4 days to obtain a resulting product. The resulting product was filtered and washed with water to obtain white powder. The white powder calcined at a temperature of 300° C. to remove the surfactant to prepare the porous silica.

Comparative Example 4

A composite material was manufactured in the same manner as in Example 1, except that porous silica having a pore size of 2.8 nm prepared in Comparative Example 3 was used.

In regard to the composite material, the amount of the lyophobic coating layer, measured by TGA, was 46.5 wt %.

(Manufacture of Cathode)

Example 4

1 g of Pt/C catalyst (28.4 wt % Pt/Vulcan electrocatalyst, TEC 10V30E, TKK, Japan) and 2.5 wt % of the composite material powder based on the total weight of the cathode manufactured according to Example 1 were added to a 250 mL polypropylene ("PP") bottle. 50 milligrams (mg) of acetone was added thereto, and the mixture was stirred for 5 minutes. Then, the mixture was ultra-sonicated for 15 minutes. Next, 180 g of distilled water was added thereto, and stirred for 5 minutes, and centrifuged at a rate of 8,000 revolutions per minute ("RPM") for 5 minutes. The PP bottle including the centrifuged mixture was added to a container containing liquid nitrogen, and the mixture was cooled. The cooled mixture was freeze-dried for 4 days. The resulting product was left in a dryroom to obtain dry powder.

1 g of the dry powder was added to a 250 mL PP bottle, and 3.2 g of N-methylpyrrolidone was added thereto and stirred in a Thinky AR-500 stirrer at a rate of 1,000 RPM for 15 minutes. PVdF was added thereto in an amount to of 2.5 wt % based on the total weight of the cathode, and the mixture was stirred in the Thinky AR-500 stirrer at a rate of 1,000 RPM for 15 minutes to obtain a cathode slurry.

A gas diffusion layer ("GDL", SGL company, 25BC) was disposed on a glass substrate, and the cathode slurry was coated thereon to provide 10 mg/cm$^2$ based on the weight after drying. Then, the substrate was dried at room temperature in the dryroom for 48 hours and at a temperature of 80° C. for 3 hours, and vacuum dried again at a temperature of 120° C. for 2 hours. The substrate was left in the dryroom to obtain a cathode.

A portion of the cathode was cut in the shape of a circle having a diameter of 8 mm and separated from the glass substrate to be used to manufacture a battery.

Example 5

A cathode was manufactured in the same manner as in Example 4, except that the composite material powder manufactured according to Example 1 was added in an amount of 5.0 wt % based on the total weight of the cathode.

Example 6

A cathode was manufactured in the same manner as in Example 4, except that the composite material powder manufactured according to Example 1 was added in an amount of 8.0 wt % based on the total weight of the cathode.

Comparative Examples 5 to 7

A cathode was manufactured in the same manner as in Example 4, except that the composite material powders manufactured according to Comparative Examples 1 to 3 were used respectively.

Comparative Example 8

A cathode was manufactured in the same manner as in Example 4, except that the composite material powder manufactured according to Comparative Example 4 was added in an amount of 5.0 wt % based on the total weight of the cathode.

(Manufacture of Lithium Air Battery)

Example 7

A separator (Celgard 3501) was disposed on a lithium metal thin film.

Then, 400 mL of an electrolyte solution in which 1 M lithium bis(trifluoromethanesulfonyl)imide ("LiTFSI") was dissolved in propylene carbonate ("PC") was injected into the separator.

A lithium-aluminum titanium phosphate ("LATP") solid electrolyte film (having a thickness of 250 μm, available from Ohara Corp., Japan) was disposed on the separator to prepare a substructure. The substructure was then covered with a pouch in which aluminum is coated on a polyolefin base. Since a fixed size of a window was provided on the upper side of the pouch, a portion of the solid electrolyte is exposed to the outside. Then, 50 microliters (μL) of an electrolyte solution in which 1 M LiTFSI was dissolved in TEGDME was injected to the solid electrolyte, which was exposed to the outside.

A separator (Celgard 3501) was disposed on the solid electrolyte, which was exposed to the outside, and 30 μL of an electrolyte solution in which 1 M LiTFSI was dissolved in TEGDME was injected to the separator.

The cathode manufactured according to Example 4 was disposed on the separator. Then, a stainless steel mesh was disposed on the cathode. The cathode was pressed and fixed by a pressing member disposed on the cathode to manufacture a lithium air battery. Air is able to pass through the pressing member and reach the cathode.

Examples 8 and 9

A lithium air battery was manufactured in the same manner as in Example 7, except that the cathodes manufactured according to Examples 5 and 6 were used respectively.

Comparative Examples 9 to 12

A lithium air battery was manufactured in the same manner as in Example 7, except that the cathodes manufactured according to Comparative Examples 5 and 8 were used respectively.

Evaluation Example 1

Lyophobicity Evaluation

The materials manufactured in Examples 1 to 3 and Comparative Examples 1 to 4 were impregnated with an electrolyte solution in which 1M LiTFSI was dissolved in TEGDME, and a color change was observed.

Lyophilic materials were completely impregnated with electrolyte solution by wetting with the electrolyte solution, and became transparent immediately or in a few seconds. The lyophobic material is not wetted by the electrolyte solution, or may be slightly wetted, and thus it may maintain a white color for at least one minute after being impregnated in the electrolyte solution.

The composite materials of Examples 1 to 3 show that the lyophobic layer was formed since they maintained a white color for 1 minute.

Also, the composite materials of Comparative Examples 1 to 3 became transparent immediately, the composite material of Comparative Example 2 became transparent after 2 or 3 seconds, and the composite material of Comparative Example 4 maintained a white color for more than 1 minute.

Comparative Example 2

Porosity Evaluation

In the materials manufactured according to Examples 1 to 3 and Comparative Examples 1 to 4, a BET specific surface area and pore size distribution (4V/A by BET) were measured by using the BET and Barrett-Joyner-Halenda ("BJH") methods, respectively. Evaluation of micropores and an external surface area was performed by using a t-plot method. Some results are shown in Table 1 below.

TABLE 1

|  | BET specific surface area [m²/g] | Average pore size (4 V/A by BET) [nm] |
| --- | --- | --- |
| Example 1 | 315.6 | 8.11 |
| Comparative Example 1 | 601.6 | 9.22 |
| Comparative Example 3 | 1084 | 2.8 |
| Comparative Example 4 | 473 | Unable to measure |

As shown in Table 1 above, the composite material in which the lyophobic coating layer of Example 1 was formed has a reduced specific surface area as compared to the porous silica of Comparative Example 1 that does not have the lyophobic coating layer.

Figure 5:
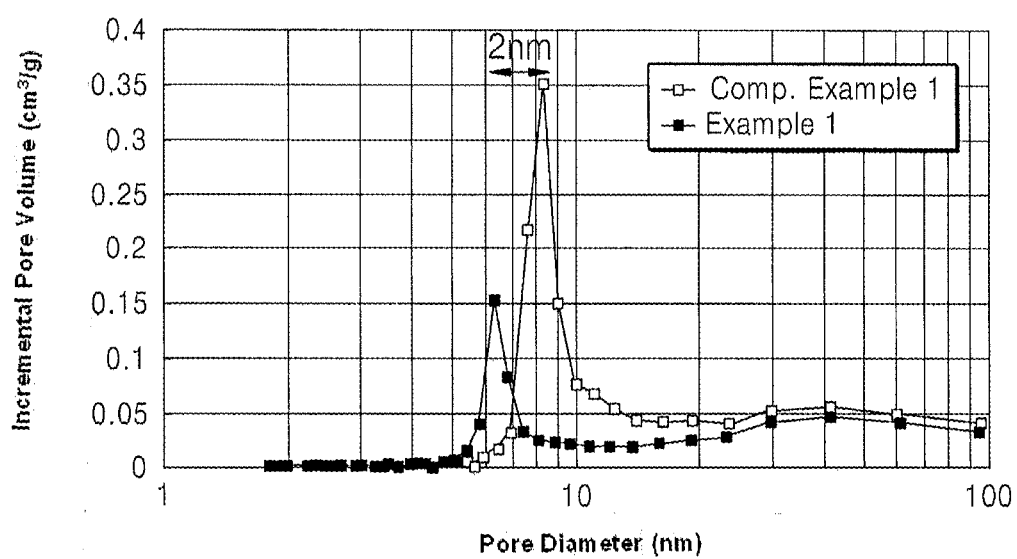
FIG. 5 is a graph of incremental pore volume (cubic centimeters per gram, $cm^3/g$) versus pore diameter (nanometers, nm) illustrating a pore distribution of the materials prepared according to Example 1 and Comparative Example 1.
Figure 6:
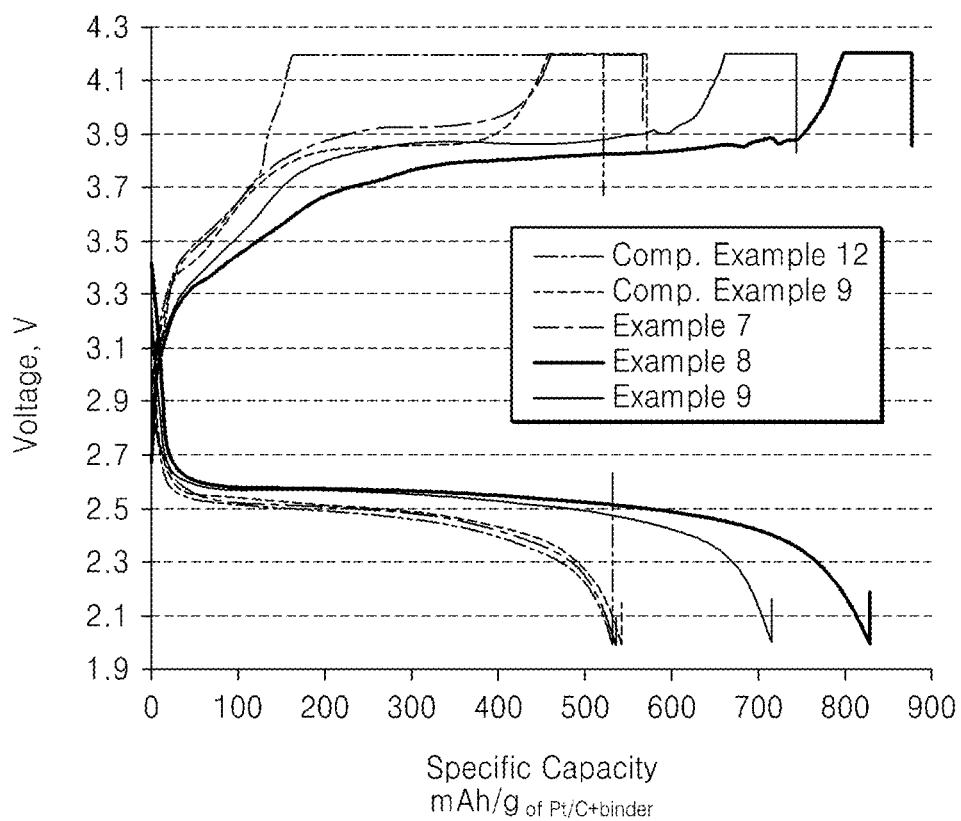
FIG. 6 is a graph of voltage (volts, V) versus specific capacity (milliampere-hours per gram, mAh/g) illustrating a first charge and discharge cycle of lithium air batteries prepared according to Examples 7 to 9 and Comparative Example 9.

Also, as shown in FIG. 5, a size of pores having the maximum volume is decreased by about 2 nm in the pore size distribution of Example 1 as compared to Comparative Example 1. Thus, it was confirmed that a lyophobic coating layer having a thickness of about 1 nm was formed on a pore surface of the porous silica.

In addition, since the average pore size is decreased by about 2 nm and the length of fluorooctyltrimethoxysilane forming the lyophobic coating layer is about 1 nm, the fluorooctyltrimethoxysilane may be bonded vertically on a pore surface or self-assembled.

A peak was not observed in the pore size distribution of Comparative Example 4 (not shown), and thus it is not substantially possible to measure the average pore size. While not wanting to be bound by theory, it is understood that the pores in Comparative Example 4 are mostly substantially clogged.

Evaluation Example 3

Evaluation of Charge and Discharge Characteristics

At a temperature of 60° C. and in a 1 atmosphere (atm) oxygen atmosphere, a charge and discharge cycle was performed in such a way that the lithium air batteries manufactured in Examples 7 to 9 and Comparative Examples 9 to 12 were each discharged to 2.0 volts (V) (vs. Li) with a constant current of 1 mA/cm², and then charged again to 4.2 V with the same current. Some results of a first cycle of a charge and discharge test are shown in Table 2 below and in FIG. 3.

The specific capacity is determined based on a total weight of a cathode including a composite material, a catalyst, and a binder.

TABLE 2

|  | Discharge specific capacity [mAh/g] |
| --- | --- |
| Comparative Example 9 | 541 |
| Comparative Example 12 | 532 |
| Example 7 | 535 |
| Example 8 | 828 |
| Example 9 | 713 |

As shown in Table 2 above, the lithium air batteries of Examples 7 to 9 have increased discharge capacity despite relatively lower BET specific surface area values compared to that of Comparative Example 9. The discharge capacity of the lithium air batteries of Examples 8 and 9 are significantly increased.

The increase in the discharge capacity may be due to an increase in oxygen delivery to the inside of the cathode and accordingly by an increase in oxygen concentration inside the cathode.

Also, according to another aspect, the discharge capacity of the lithium air battery may be increased by including the novel organic-inorganic composite material.

It should be understood that the exemplary embodiments disclosed herein shall be considered in a descriptive sense only and not for purposes of limitation. Descriptions of features, advantages, or aspects within each embodiment should be considered as available for other similar features, advantages, or aspects in other embodiments.

What is claimed is:

1. A method of manufacturing an air battery cathode, the method comprising combining an organic-inorganic composite material and a binder to manufacture the cathode, wherein the organic-inorganic composite material is manufactured by:
   impregnating a porous material with a reactive compound comprising a reactive functional group bondable to the porous material; and
   chemically bonding the reactive compound to a surface of the porous material to form a surface modifier on the surface of the porous material to manufacture the organic-inorganic composite material,
   wherein the porous material comprises an oxide of an element of Groups 3 to 14 of the Periodic Table.

2. A method of manufacturing an air battery cathode, the method comprising combining an organic-inorganic composite material and a binder to manufacture the cathode, wherein the organic-inorganic composite material is manufactured by:
   impregnating a porous material with a reactive compound comprising a reactive functional group bondable to the porous material; and
   chemically bonding the reactive compound to a surface of the porous material to form a surface modifier on the surface of the porous material to manufacture the organic-inorganic composite material,
   wherein the chemically bonding is performed at a temperature in a range from about 40° C. to about 80° C.

3. The method of claim 1, wherein the reactive functional group is a hydroxyl group, a thiol group, an alkoxy group, a thioalkyl group, a halogen group, an aldehyde group, a carboxyl group, or a carboxylate group.

4. The method of claim 3, wherein the reactive compound is a silane.

5. The method of claim 1, wherein the organic-inorganic composite material comprises surface modified nanopores.

6. The method of claim 1, wherein the surface modifier is on a surface of a nanopore of the porous material.

7. The method of claim 1, wherein pores of the porous material are ordered.

8. The method of claim 1, wherein pores of the porous material have a periodic pore structure, and a contact angle of the surface modifier with respect to water at a temperature of 20° C. is greater than about 90°.

9. The method of claim 1, wherein the organic-inorganic composite material has an average pore size in a range from about 3 nanometers to about 50 nanometers.

10. The method of claim 9, wherein the organic-inorganic composite material has a peak in a pore size distribution of the organic-inorganic composite material in a range from about 3 nanometers to about 50 nanometers, and 75% of the nanopores have a size of about 3 nanometers to about 50 nanometers.

11. The method of claim 9, wherein an amount of the surface modifier may be about 2 weight percent to about 50 weight percent, based on a total weight of the organic-inorganic composite material.

12. The method of claim 1, wherein the organic-inorganic composite material has an average pore size in a range from about 3 nanometers to about 15 nanometers.

13. The method of claim 1, wherein the organic-inorganic composite material is in a form of particles.

14. The method of claim 1, wherein the porous material comprises surface modified nanopores, and the surface modifier is disposed on at least a portion of the surface modified nanopores.

15. The method of claim 2, wherein the porous material comprises an element of Groups 3 to 14 of the Periodic Table.

16. The method of claim 1, wherein the porous material comprises Mg, Al, Si, P, Ca, Ti, V, Ga, Ge, Sr, Zr, Nb, Mo, In, Sn, Hf, Ta, or W.

17. The method of claim 1, wherein the surface modifier comprises an organic compound which is bonded to the surface of the pores of the porous material.

18. The method of claim 1, wherein the surface modifier comprises F, Cl, Br, or I.

19. The method of claim 1, wherein the surface modifier comprises silicon.

20. The method of claim 1, wherein the surface modifier has a thickness in a range from about 0.1 nanometers to about 20 nanometers.

21. The method of claim 1, wherein the organic-inorganic composite material has a specific surface area in a range from about 200 square meters per gram to about 400 square meters per gram, when measured using the Brunauer-Emmett-Teller method.

22. The method of claim 1, wherein the surface modifier is bonded to the surface of the porous material via an —O—Si— bond.

23. The method of claim 2, wherein the organic-inorganic composite material has a specific surface area in a range from about 200 square meters per gram to about 400 square meters per gram, when measured using the Brunauer-Emmett-Teller method.

24. The method of claim 2, wherein the surface modifier is bonded to the surface of the porous material via an —O—Si— bond.

* * * * *